May 3, 1955

O. W. MAGNUSON 2,707,418

CAMERA FILTER HOLDER

Filed Jan. 14, 1952

Inventor
Otto W. Magnuson
By McCanna and Morsbach
Attys.

United States Patent Office 2,707,418
Patented May 3, 1955

2,707,418

CAMERA FILTER HOLDER

Otto W. Magnuson, Rockford, Ill.

Application January 14, 1952, Serial No. 266,312

7 Claims. (Cl. 88—113)

This invention relates to a holder for optical auxiliaries, such as light filters and auxiliary lenses, and particularly to such a holder for use on photographic cameras.

An object of this invention is to provide a holder of novel and simplified construction which facilitates the mounting and removal of an optical auxiliary therefrom.

Another object of this invention is to provide a holder of novel construction, especially adapted for use on cameras, in which optical auxiliaries, such as filters and auxiliary lenses, may be readily mounted and removed in a novel manner.

It is also an object of this invention to provide a holder for optical auxiliaries which is readily adapted for use on a wide variety of photographic cameras.

A further object of this invention is to provide a holder for disc shaped optical auxiliaries in which the portion of the holder which is adjustable for mounting and removing the optical auxiliary need never be entirely disassembled from the stationary part of the holder.

Other objects and advantages of the invention will be apparent from the following description of a preferred embodiment thereof.

Figure 1:
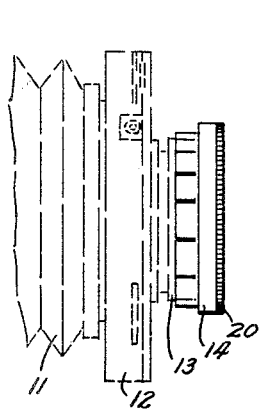
Figure 1 illustrates the mounting of the holder of the present invention on a conventional camera of one type.
Figure 2:
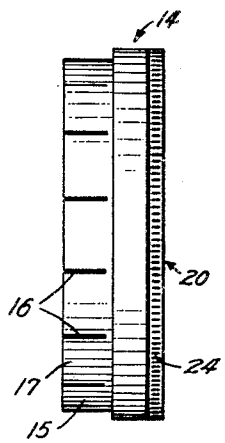
Figure 2 illustrates one form of the part of the holder which is mounted stationarily on the camera.
Figure 3:
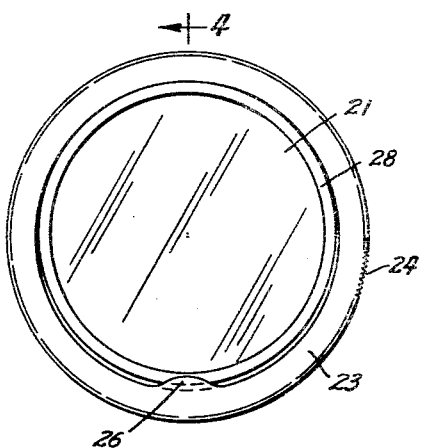
Figure 3 is a front view of the assembly of the optical auxiliary and the holder.

Referring to Fig. 1, there is shown fragmentarily the front of a conventional camera of one type having a bellows 11, shutter 12, and lens 13. The holder includes a circular body 14 which has an integral, annular, rearwardly extending mounting flange 15. Flange 15 is formed with a plurality of circumferentially spaced slits 16 to define spring fingers 17 adapted to be slipped over the annulus of the lens 13 to grip the same. At its front end, the circular body 14 is internally threaded at 18. A transverse, inwardly protruding, flat annular wall 19 is formed on the ring member 14 immediately behind the threaded portion 18. The ring member 14 is a standard item on photographic equipment and may, within the purview of this invention, be replaced by any suitable member adapted to be stationarily mounted on the camera lens, and preferably also readily demountable therefrom.

The present invention also includes an adjustable ring member 20 for releasably clamping the optical auxiliary, in this instance a light filter 21, in place on the holder 14. Ring 20 is formed with a rear portion of reduced cross-section which is externally threaded at 22 for threaded engagement with the inner threads 18 on holder 14. At its front end the ring 20 is formed with an enlarged annular portion 23, which preferably is knurled externally at 24 to facilitate manual gripping. The ring 20 defines a substantially cylindrical passage 25 in which the filter 21 is adapted to seat. At one portion the cylindrical form of passage 25 is broken by a protrusion 26, which is formed with a beveled cam surface 27 which inclines inwardly toward the front end of ring 20.

The glass filter 21 is of conventional disc shaped cylindrical form with a metal edging 28. The filter 21 is of such size as to loosely fit within the passage 25 in ring 20.

Figure 4:
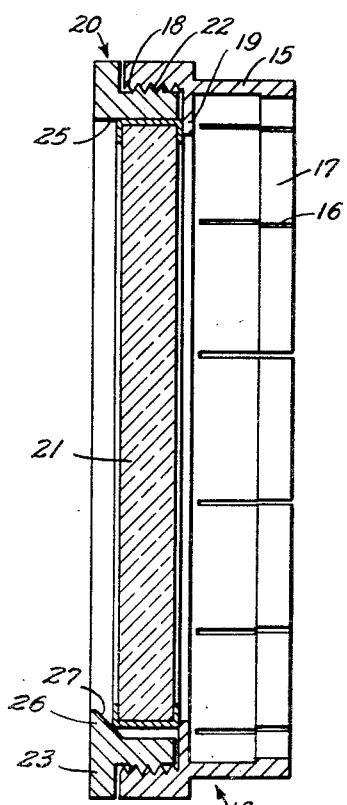
Figure 4 is a section along the line 4—4 in Fig. 3, with the optical auxiliary clamped securely in place.
Figure 5:
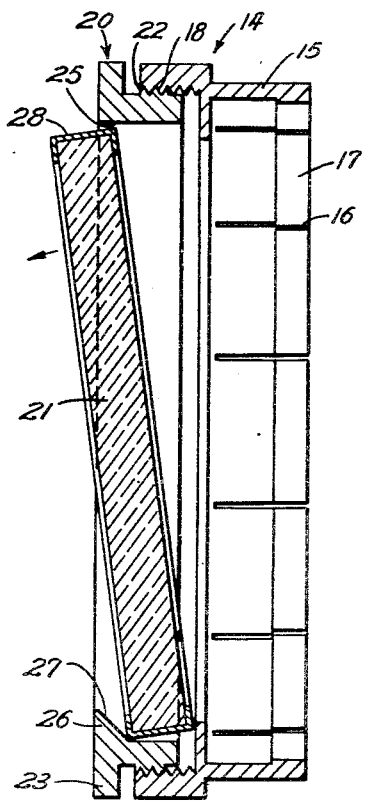
Figure 5 is a view similar to Fig. 4 with the holder loosened for removal of the optical auxiliary.

When the filter is seated in place in the holder (Fig. 4), the cam surface 27 of the protrusion 26 on ring 20 engages a portion of the front edge of filter 21 to wedge the opposite edge face thereof into snug engagement with the opposite portion of the internal wall which defines the passage 25 in ring 20. Also, the cam surface 27 forces the filter 21 rearwardly to position its back edge abutting against the forward face of the internal shoulder 19 on the outer, stationary holder member 14.

To release the filter 21 from its holder, the outer ring 20 is turned about one-half turn or so in a direction to move its cam surface 27 away from the shoulder 19 on the outer holder member 14. This releases the force on filter 21 which wedges the latter against the internal wall defining passage 25 and against the shoulder 19. With the release of this wedging force the filter 21 readily slips out of the holder. If desired, a new filter may be inserted into the holder, and when the ring 20 is turned again to assume its Fig. 4 position the new filter is clamped in place.

From the foregoing, it will be seen that the present invention embodies a holder which reduces to a minimum the adjustments required for inserting and removing the optical auxiliary. These adjustments can be made in a fraction of the time previously found necessary on prior holders, and it is never necessary to completely disassemble the parts of the holder in order to insert or remove an optical auxiliary.

While in the foregoing description the present invention is shown as applied to a particular form of camera, it is to be understood that it is of general utility on various types of cameras, or on other devices where it is desired to have a holder adapted for the quick mounting or removal of an optical auxiliary. Also, it is to be understood that various changes, modifications, refinements and omissions departing from the particular described form of the invention may be adopted without departing from the spirit and scope of my invention.

I claim:

1. A holder for an optical auxiliary, comprising a stationary member defining a seating surface for one face of the optical auxiliary, an adjustable member, means adjustably mounting said adjustable member on said stationary member for adjustment toward and away from said seating surface thereon, said adjustable member having an interior wall defining a passage extending completely therethrough and dimensioned to loosely receive the optical auxiliary, and said adjustable member carrying at said passage a cam surface which inclines inwardly in a direction away from said seating surface on the stationary member for engaging an edge portion of the optical auxiliary remote from said one face thereof to force the optical auxiliary against said seating surface and to force edge portions of the optical auxiliary remote from said cam surface snugly against the wall defining said passage in the adjustable member when the adjustable member is adjusted along the stationary member in a direction toward said seating surface thereon.

2. A holder for a disc shaped optical auxiliary, comprising a stationary member defining a seating surface for the rear face of the optical auxiliary, an adjustable member threadedly mounted on said stationary member for adjustment therealong rearwardly toward said seating surface thereon and forwardly away from said seating surface, said adjustable member having an interior wall defining an axial passage extending completely through the adjustable member and dimensioned to loosely receive the optical auxiliary for removal of the optical auxiliary through said passage when the adjustable member is adjusted forwardly away from said seating surface, said adjustable member being formed at the front end of said passage with a cam surface which inclines transaxially inward and forwardly in a direction away from said seating surface on the stationary member for engaging an edge portion of the optical auxiliary at the front face thereof to force the optical auxiliary rearwardly against said seating surface on the stationary member and to force the edge of the optical auxiliary remote from said cam surface into engagement with the wall defining said axial passage in the adjustable member when the adjustable member is threaded rearwardly along the stationary member, and said adjustable member having a portion projecting beyond the stationary member in all adjusted positions of the adjustable member on the stationary member for manual engagement by the user to adjust the adjustable member on the stationary member.

3. A holder for a disc shaped optical auxiliary, comprising a stationary ring member formed with an internal, transverse, annular wall defining a flat, forwardly facing seating surface for the rear face of the optical auxiliary, said stationary ring member being internally threaded forwardly of said seating surface, an adjustable ring member formed with an externally threaded rear portion operable to threaded engage said internally threaded portion of the stationary ring member for mounting the adjustable ring member adjustably on the stationary ring member for adjustment along the stationary member rearwardly toward said seating surface and forwardly away from said seating surface, said adjustable ring member having an interior wall defining an axial passage extending completely through the adjustable member and dimensioned to loosely receive the optical auxiliary for removal of the optical auxiliary from the assembly of ring members when the adjustable ring member is adjusted forwardly away from said seating surface, said adjustable ring member being formed at the forward end of said axial passage with a protrusion defining a cam surface at one portion of said passage wall which inclines transaxially inward in a forward direction for engaging an edge portion of the optical auxiliary at the front face thereof to force the optical auxiliary rearwardly into engagement with said seating surface on the stationary ring member and to force the edge of the optical auxiliary remote from said cam surface on the adjustable ring member snugly into engagement with the adjacent portion of the passage wall in the adjustable ring member when the adjustable ring member is threaded rearwardly along the stationary ring member, and said adjustable ring member having a portion projecting beyond the stationary ring member in all adjusted positions of the adjustable ring member on the stationary ring member for manual engagement by the user to adjust the adjustable ring member along the stationary ring member.

4. A holder for a disc-shaped optical auxiliary for a camera, comprising a stationary ring member adapted to be mounted at the front of a camera lens, said stationary ring member being formed with an internal, transverse annular wall defining a flat, forwardly facing seating surface for the rear face of the optical auxiliary, said stationary ring member being internally threaded forwardly of said seating surface, an adjustable ring member formed with an externally threaded rear portion operable to be threadedly received in the stationary ring member at said internally threaded portion thereof for adjustment of the adjustable ring member along the stationary ring member rearwardly toward said seating surface and forwardly away from said seating surface, said adjustable ring member having an interior wall defining a substantially cylindrical axial passage extending completely through the adjustable ring member and dimensioned to loosely receive the optical auxiliary for removal of the optical auxiliary from the assembly of ring members when the adjustable ring member is adjusted forwardly away from said seating surface, said adjustable ring member being formed at a portion of the passage wall at the forward end of said passage with a cam surface which inclines transaxially inward in a forward direction for engaging an edge portion of the optical auxiliary at the front face thereof to force the rear face of the optical auxiliary rearwardly against said seating surface on the stationary ring member and to force the edge of the optical auxiliary opposite said cam surface on the adjustable ring member into snug engagement with the adjacent portion of the passage wall in the adjustable ring member when the adjustable ring member is threaded rearwardly along the stationary ring member, and said adjustable ring member having an annular knurled portion projecting beyond the stationary ring member in all adjusted positions of the adjustable ring member along the stationary ring member for manual gripping to adjust the adjustable ring member manually along the stationary ring member.

5. A holder for an optical auxiliary, comprising two interconnected relatively adjustable holder members, the first of said holder members defining a seating surface for one face of the optical auxiliary, the second of said holder members having an interior wall defining a passage extending completely therethrough dimensioned to loosely receive the optical auxiliary, means mounting said holder members for relative adjustment between said seating surface on the first holder member and the second holder member toward and away from one another, said passage through the second holder member permitting removal of the optical auxiliary when the holder members are adjusted relative to one another to move the second holder member and said seating surface relatively away from one another, the second holder member carrying at said passage a cam surface which inclines inwardly in a direction away from said seating surface to engage an edge portion of the optical auxiliary remote from said one face thereof to force the optical auxiliary against said seating surface and to force the edge of the optical auxiliary remote from said cam surface snugly against the wall defining said passage in the second holder member when said holder members are relatively adjusted to move the second holder member and said seating surface relatively toward one another, one of said holder members carrying a portion projecting beyond the other holder member in all relative adjusted positions thereof for manual engagement by the user to effect relative adjustment between said holder members.

6. A holder for an optical auxiliary, comprising a fixed member, an adjustable ring member, means mounting said ring member on said fixed member for adjustment therealong, one of said members having an interior wall defining a passage dimensioned to loosely receive the optical auxiliary, said fixed member providing a seating surface against which one face of the optical auxiliary is adapted to seat, said adjustable member carrying a cam surface inclining inwardly in a direction away from said seating surface on the fixed member and located at said passage to engage an edge portion of the optical auxiliary spaced from said one face thereof to force the optical auxiliary against said seating surface on the fixed member and to wedge the optical auxiliary snugly in place against the wall defining said passage when the adjustable member is adjusted along the fixed member in a direction toward said seating surface, said adjustable member carrying a portion projecting beyond the fixed member in all adjusted positions of the adjustable member on the fixed member for manual engagement by the user to adjust the adjustable member along the fixed member.

7. In combination, a holder for an optical auxiliary, comprising a fixed member providing a surface against which one face of the optical auxiliary is adapted to seat, an adjustable member, means mounting said adjustable member coaxially of said fixed member for axial adjustment relative to said fixed member, said adjustable member having an interior wall defining a passage, and a disc shaped optical auxiliary in said passage in the adjustable member dimensioned to pass loosely through said passage, said adjustable member carrying at said passage a cam surface which inclines inwardly in a direction away from said seating surface on the fixed member and which engages an edge portion of the optical auxiliary remote from said one face thereof to force the optical auxiliary against said seating surface and to force the edge of the optical auxiliary remote from said cam surface snugly against the wall defining said passage in the adjustable member when the adjustable member is adjusted along the fixed member in a direction toward said seating surface thereon, said passage in the adjustable member permitting removal of the optical auxiliary when the adjustable member is adjusted along the fixed member in a direction away from said seating surface thereon, said adjustable member carrying a portion projecting beyond the fixed member in all adjusted positions of the adjustable member along the fixed member for manual engagement by the user to adjust the adjustable member along the fixed member.

References Cited in the file of this patent

FOREIGN PATENTS

| | | |
|---|---|---|
| 8,934 | Great Britain | of 1891 |
| 285,426 | Germany | June 30, 1915 |
| 979,535 | France | Dec. 13, 1950 |